United States Patent [19]

Fuchs et al.

[11] Patent Number: 5,681,886

[45] Date of Patent: Oct. 28, 1997

[54] CAOUTCHOUC MIXTURE, TREAD MADE THEREFROM AND TIRE WITH THIS TREAD

[75] Inventors: Hans-Bernd Fuchs, Alzenau-Hörstein; Günter Dietrich, Frankfurt am Main; Ulrich Steinbrecht, Ober-Ramstadt, all of Germany

[73] Assignee: SP Reifenwerke GmbH, Hanau, Germany

[21] Appl. No.: 398,491

[22] Filed: Mar. 3, 1995

[30] Foreign Application Priority Data

Mar. 22, 1994 [DE] Germany ............................ 44 09 861.8

[51] Int. Cl.$^6$ ............................ C08L 9/06; C08L 19/00; C08K 3/36
[52] U.S. Cl. .................... 524/493; 524/492; 524/515; 524/483; 524/484; 525/151; 525/241; 525/332.5; 525/332.6; 525/333.1; 525/333.2; 525/237; 152/209 R
[58] Field of Search ........................ 524/62, 68, 493, 524/418, 483, 484, 476, 492, 515; 525/191, 241, 332.5, 332.6, 333.1, 333.2, 237

[56] References Cited

U.S. PATENT DOCUMENTS

| | | | |
|---|---|---|---|
| 3,963,659 | 6/1976 | Binder et al. | 524/70 |
| 4,925,894 | 5/1990 | Futamura | 524/484 |
| 4,981,911 | 1/1991 | Herrmann et al. | 525/258 |
| 5,104,941 | 4/1992 | Wolpers et al. | 525/237 |
| 5,227,425 | 7/1993 | Rauline | 524/493 |
| 5,300,577 | 4/1994 | DiRossi et al. | 525/237 |
| 5,328,949 | 7/1994 | Sandstrom et al. | 524/493 |
| 5,336,730 | 8/1994 | Sandstrom et al. | 524/493 |

*Primary Examiner*—Paul R. Michl
*Assistant Examiner*—Olga Asinovsky
*Attorney, Agent, or Firm*—Birch, Stewart, Kolasch & Birch, LLP

[57] ABSTRACT

A rubber mixture vulcanizable with sulphur, a tire tread manufactured from it and also tires with a vulcanized tread are proposed. The rubber mixture contains in each case 100 parts by weight of elastomers, 20 to 80 parts by weight of a copolymer of conjugated diene and vinyl aromatic compound with very low long chain branching manufactured by solution polymerization in a hydrocarbon solvent, 10 to 50 parts by weight of polybutadiene with very low long chain branching, 10 to 30 parts by weight of polyisoprene with a 3,4 bond content of 50 to 70% by weight and 30 to 100 parts by weight of silica as filler material. Through the special combination of the three elastomers with silica as a filler material one obtains an easily processable mixture which leads to vulcanized tire treads with improved grip on wet and dry surfaces.

13 Claims, No Drawings

CAOUTCHOUC MIXTURE, TREAD MADE THEREFROM AND TIRE WITH THIS TREAD

The present invention relates to a caoutchouc mixture vulcanisable with sulphur which contains a copolymer of conjugated diene and vinyl aromatic compound manufactured by solution polymerisation in a hydrocarbon solvent, further elastomers, silica as a filler material, customary additives and also a vulcanisation system. Furthermore, the invention relates to tire treads which contain this caoutchouc mixture and also tires with a tire tread which contains the vulcanised caoutchouc mixture.

The characteristics desired in tires can only be simultaneously achieved with difficulty. Thus measures which lead to a reduction of the rolling resistance bring about a reduction of the resistance to abrasion. The full or partial substitution of carbon black by the filler material silica, for example, admittedly reduces the rolling resistance of the tire but leads to a deterioration of its resistance to abrasion. In order to avoid this deterioration it is proposed in EP 0 299 074 B1, for caoutchouc mixtures which contain silica as filler material in large proportions, to use polymers which are modified with a special silane compound. This measure is unfavourable for industrial application because of the use of special silane compounds.

In order to avoid this disadvantage a caoutchouc mixture is proposed in EP 0 501 227 A1 which contains a copolymer of conjugated diene and vinyl aromatic compound manufactured by solution polymerisation in a hydrocarbon solvent, a quite special silica, which is for example manufactured in accordance with the method described in EP 0 157 703 B1, customarily used additives and also a vulcanisation system. This caoutchouc mixture is manufactured in known manner by stepwise mixing of the components, with temperatures being kept to at which cross-linking still does not occur. At least one further diene elastomer can be added to the caoutchouc mixture for dilution, such as for example, polyisoprene, natural caoutchouc or polybutadiene. A copolymer which is manufactured in solution in a hydrocarbon solvent in the presence of an initiator of an alkali metal or alkali earth metal compound, such as is for example described in FR-PS 2 295 972, can be used as the copolymer of conjugated diene and vinyl aromatic compound.

The object underlying the invention is the preparation of caoutchouc mixtures which not only result in tire treads with a good combination of abrasion resistance and rolling resistance, but rather also result in improved driving characteristics on dry and wet carriageways and which can be better and more simply processed.

Starting from the initially named caoutchouc mixture vulcanisable with sulphur this object is satisfied in that the caoutchouc mixture contains 20 to 80 parts by weight of copolymer of conjugated diene and vinyl aromatic compound with very little long chain branching, a defoelasticity in the range from 15 to 25 mm determined in accordance with DIN 53514 and a Mooney viscosity in the range of 30 to 80 Mooney units determined with a Mooney apparatus in accordance with DIN 53523, 10 to 50 parts by weight of polybutadiene with very little long chain branching and without Mooney step, 10 to 30 parts by weight of polyisoprene with a 3,4 bond content of 50 to 70 percent by weight determined in accordance with the NMR method, and 30 to 100 parts by weight of silica, with all parts by weight being related to 100 parts by weight of total elastomers.

Furthermore, tire treads which contain this caoutchouc mixture and also tires which have treads vulcanised with sulphur form the subject of the invention. The caoutchouc mixture of the invention can be used from the manufacture of tire treads which are suitable for the tires of motorcars, motorcycles, 4×4 cross country vehicles, transporters and light trucks.

The simplified and improved processability of the caoutchouc mixture of the invention makes itself noticible both during the mixing step and also during the extrusion step. One has lesser shrinkage, that is to say the extruded product from the mixture of the invention retains its shape better. Furthermore, the tires manufactured from the mixture of the invention have better wet and dry grip than tires of caoutchouc mixtures which do not contain the elastomers used in accordance with the invention and also only contain carbon as a filler material. These characteristics are achieved by a special combination of three elastomers with special characteristics, and also by the use of silica as a filler material.

As a first elastomer the caoutchouc mixture of the invention contains a copolymer of conjungated diene and vinyl aromatic compound manufactured by solution polymerisation in a hydrocarbon solvent. The copolymer has a very low long chain branching. The defoelasticity is to lie in the range of 15 to 25 mm determined in accordance with DIN 53514 and preferably in the range of 15 to 20 mm. The Mooney viscosity lies in the range from 30 to 80 Mooney units, measured with a Mooney apparatus in accordance with D 53523. The copolymerisation is so carried out in a hydrocarbon solvent in the presence of an organolithium initiator that no coupling reactions arise and a Mooney step (step change in the molecular mass) does not take place. The smallest possible quantity of divinyl benzene is used for the copolymerisation. Copolymers of styrene and butadiene manufactured by solvent polymerisation with very low long chain branching and with a defoelasticity and also Mooney viscosity within the claimed ranges are commercially available for example Calprene® 377 of the company Repsol.

The copolymer preferably has a content of 15 to 35% by weight on vinyl aromatic compound, a 1,2 bond content in the diene component of 25 to 70 parts by weight and also a glass transition temperature (Tg) of −60° C. to −10° C. determined in accordance with the torsional pendulum method.

The content of the copolymer preferably amounts to 40 to 60 parts by weight per 100 parts by weight of total elastomers in the caoutchouc mixture of the invention.

1,3-butadiene, isoprene and 2,3-dimethyl-1,3-butadiene are suitable as the conjugated diene of the copolymer. Styrene and o-, m-, and p-methyl styrene are suitable as the vinyl aromatic compound of the copolymer. Styrene-butadiene copolymer is preferably used.

The copolymer can be used in the form of oil extended copolymer. As a rule the total oil content of the caoutchouc mixture can lie in the range from 30 to 45 parts by weight per 100 parts by weight of total elastomers.

As a second elastomer the caoutchouc mixture of the invention contains polybutadiene with very low long chain branching and without a Mooney step in a quantity of 10 to 50 parts by weight per 100 parts by weight of total elastomers. The polybutadiene preferably has a glass transition temperature of −107° C. to −95° C. determined in accordance with the torsional pendulum method. A suitable polybutadiene is for example a titanium polybutadiene type of Bayer AG.

As a third elastomer the caoutchouc mixture of the invention contains 10 to 30 parts by weight of polyisoprene per 100 parts by weight of total elastomers. The 3,4 bond content amounts to 50 to 70% by weight determined in accordance with the NMR method, preferably 60% by weight. The glass transition temperature (Tg) determined in accordance with the torsional pendulum method amounts to preferably −15° C. to +5° C.

The caoutchouc mixture of the invention can, in addition to the three elastomers, also contain natural caoutchouc in a quantity of 0 to 40 parts by weight per 100 parts by weight of total elastomers.

As a filler material the caoutchouc mixture of the invention contains silica in a quantity of 30 to 100 parts by weight per 100 parts by weight of total elastomer content. As silica both "classical" silica as well as silica with an optimised dispersability in the caoutchouc mixture can be used. Under "classical" silica there is to be understood silica such as is customarily used for tire manufacture and which is offered as a commercial product from various manufacturers. These silicas normally have a BET surface between 100 and 250 m$^2$/g in accordance with DIN 66 131, ISO 5794/1 Annex D, a CTAB surface between 100 and 250 m$^2$/g in accordance with ISO 6810, ASTM D-3765 and an oil take-up measured with DBP between 150 and 250 ml/100 g in accordance with ISO S-4656, ASTM D-2414, DIN 53601. As silica with an optimised disperability one can for example use silica such as is described in EP-0 157 703 B1. In accordance with the invention a silica with a BET surface between 150 and 250 m$^2$/g is preferably used. The caoutchouc mixture preferably contains 40 to 80 parts by weight of silica per 100 parts by weight of total elastomers.

As a further filler material the caoutchouc mixture of the invention can contain carbon black. The carbon black content should not be higher than the content of silica and the total content of filler materials should not be higher than 100 parts by weight related to 100 parts by weight of total elastomers. When carbon black is added to the mixture the content preferably lies in the range from 20 to 40 parts by weight related to 100 parts by weight of total elastomers. In addition carbon black can also be contained in the reinforcing filler (intensifier).

As customary additives the caoutchouc mixture of the invention can contain aromatic and/or naphthenic oils, reinforcing fillers, aging protection agents, tackifiers, activators and processing aids. All these additives are used in the customary range of quantities. When a part of the silica is substituted by carbon then the reinforcing filler is used in a smaller quantity. Furthermore, the caoutchouc mixture in accordance with the invention contains a vulcanisation system with sulphur and vulcanisation accelerators.

The caoutchouc mixture can be manufactured in accordance with the following multi-stage process. In a first stage the elastomers are mixed with the customary additives and the silica in a kneader. During this the temperature should not rise to values at which cross-linking already sets in. Normally temperatures of 160° to 170° C. should not be exceeded. After the cooling down of the mixture it is kneaded again in a second stage and again the temperature should not rise to values at which cross-linking takes place. In a subsequent third stage the vulcanisation system is worked in on a roll and during this temperatures are also kept to below the cross-linking temperature. The times for the mixing processes in the individual stages are respectively so dimensioned that a good through-mixing of the components is achieved.

The invention will be explained in more detail with reference to the following examples.

Three caoutchouc mixtures with the compositions set forth in the following table were manufactured, in each case the parts by weight of the components in the mixtures are set forth. The mixture 1 is a comparison recipe, the mixtures 2 and 3 are recipies in accordance with the invention.

TABLE

| Caoutchouc mixture | 1 | 2 | 3 |
| --- | --- | --- | --- |
| E-SBR | 125.6 | | |
| S-SBR | | 89.38 | 89.38 |
| Polybutadiene | | 20 | 20 |
| Polyisoprene | | 15 | 15 |
| Carbon black N 234 | 79 | | |
| Carbon black N 335 | | | 40 |
| Silica VN3 | | 80 | 40 |
| Reinforcing filler | | 12.8 | 6.4 |
| Zinc oxide | 3.0 | 3.0 | 3.0 |
| Stearic acid | 1.5 | 2.0 | 2.0 |
| Aromatic oil (total) | 38.3 | 38.6 | 38.6 |
| Aging protection agent | 2.9 | 3.5 | 3.5 |
| Vulcanisation accelerator A | 1.4 | 1.7 | 1.7 |
| Vulcanisation accelerator B | | 1.5 | 0.8 |
| Sulphur | 1.9 | 1.4 | 1.4 |
| Wet grip/dry grip | 100 | 110 | 104 |
| Processability | good | very good | very good |

The components set forth in the above table are explained in the following:

E-SBR: Styrene-butadiene copolymer manufactured by emulsion polymerisation with a styrene content of 23,5% by weight. It is a mixture of oil extended and non-extended styrene-butadiene copolymer. The oil content of the oil extended copolymer amounts to 37,5 parts by weight per 100 parts by weight of copolymer. The ratio of oil extended to unextended copolymer in the mixture is approximately 68:32, so that 125,6 parts by weight of the mixture contain 100 parts by weight of elastomer.

S-SBR: Styrene-butadiene copolymer manufactured by solution polymerisation in a hydrocarbon solvent with a styrene content of 25% by weight and a 1,2 bond content in the butadiene component of 30% by weight. The copolymer is oil extended with a content of 37,5 parts by weight of highly aromatic oil per 100 parts by weight of copolymer. The copolymer has a very low long chain branching and a Mooney viscosity ML (1+4) 100° C. of 50±4, determined in accordance with ASTM D 1646. A copolymer of this kind is for example commercially available under the designation Calprene® 377 from Repsol.

Polybutadiene: The polybutadiene has a very low long chain branching. This is a special titanium polybutadiene type of Bayer AG.

Polyisoprene: This is a polyisoprene with a 3,4 bond content of 60% by weight.

Carbon black N 234: BET surface 125 m$^2$/g determined in accordance with ISO S-4652, ASTM D-3037, DIN 66132; CTAB surface 120 m$^2$/g determined in accordance with ISO 6810, ASTM D-3765; DBP absorption 125 ml/100 g determined in accordance with ISO S-4656, ASTM D-2414; DIN 53601, commercial product of Degussa Corax® N 234.

Carbon black N 335: BET surface 87 m$^2$/g; CTAB surface 87 m$^2$/g; DBP absorption 110 ml/100 g. Commercial product of Degussa Corax® N 335.

Silica VN3: BET surface 170 m$^2$/g, commercial product of Degussa Ultrasil® VN3 granulat.

Reiforcing filler: Mixture in the ratio 1:1 of carbon black N 330 and polysulphidic organosilane, commercial product of Degussa X 50-S.

Aromatic oil: The parts by weight set forth in the table relate to the total content of aromatic oil in the caoutchouc mixture which is composed of the oil contained in the oil extended copolymers and the added oil.

Aging protection agent: Mixed di-aryl-p-phenylene diamine.

Vulcanisation accelerator A: CBS (N-cyclohexyl-2-benzo-thiazol sulfonamide).

Vulcanisation accelerator B: DPG (N,N'-diphenyl guanidine).

The caoutchouc mixtures were each manufactured in the following manner. In a first stage the elastomers were put into a kneader with a kneader temperature of 50° C. and a speed of kneader rotation of 50 per min and kneaded. Then zinc oxide, stearic acid and aging protection agent were added and kneaded in. Thereafter in each case one half of the silica, of the reinforcing filler and of the aromatic oil were added and kneaded in in the case of the mixture 2, as were one half of the carbon black and of the aromatic oil in the case of the mixture 1 and one half of the silica, of the carbon black, of the reinforcing filler and of the aromatic oil in the case of the mixture 3.

Finally, in each case the second half of the above named components was added and kneaded in. During the entire mixing process a maximum temperature of 160° C. was kept to.

After the cooling down of the mixtures they were kneaded again in the second stage and again a temperature of 160° C. was not exceeded. The second stage was only carried out for the mixtures 2 and 3, but not however for the mixture 1. Finally, the vulcanisation system comprising sulphur and vulcanisation accelerator was mixed in on a roll in a further stage. During this a temperature below the cross-linking temperature was also kept to.

The mixtures were then processed to tire treads by shaping and vulcanisation under customary conditions.

The processability was compared both for the manufacture of the mixtures and their shaping. The processability of the comparison recipe 1 was assessed to be good, the recepies 2 and 3 of the invention however show better processability during the mixing process and during the shaping process relative to the comparison recipe 1 and were thus assessed as very good.

Tires with vulcanised treads manufactured from the mixtures were tested under identical conditions on dry and wet surfaces of the test stretch. In each case the value 100 was associated with the wet and dry grip of the tire with a tread manufactured from the comparison recipe 1. The wet and dry grips for tires with tire treads manufactured from the mixtures of the invention were in each case set forth in the table as relative values in comparision with the reference value 100. Values over 100 signify an improvement of these characteristics.

As can be seen from the values set forth in the table both the processability of the mixtures of the invention and also the grip on dry and wet surfaces of vulcanised tire treads manufactured from these mixtures are better than for the comparison mixture.

We claim:

1. Rubber mixture vulcanisable with sulphur which comprises:

20 to 80 parts by weight of copolymer of conjugated diene and vinyl aromatic compound manufactured by solution polymerisation in a hydrocarbon solvent and having very little long chain branching, a defoelasticity in the range from 15 to 25 mm determined in accordance with DIN 53 514 and a Mooney viscosity in the range of 30 to 80 Mooney units determined with a Mooney apparatus in accordance with DIN 53 523, 10 to 50 parts by weight of polybutadiene with very little long chain branching and without Mooney step, 10 to 30 parts by weight of polyisoprene with a 3,4 bond content of 50 to 70 percent by weight determined in accordance with the NMR method, as sole elastomers, and 40 to 100 parts by weight of silica, with all parts by weight being related to 100 parts by weight of total elastomers, customary additives, and a vulcanisation system.

2. Rubber mixture in accordance with claim 1, wherein the copolymer has a defoelasticity in the range of 15 to 20 mm.

3. Rubber mixture in accordance with claim 1, wherein the copolymer contains 15 to 35% by weight of vinyl aromatic compound and wherein the 1,2 bond content in the diene component amounts to 25 to 70% by weight.

4. Rubber mixture in accordance with claim 1, wherein the copolymer is present in an amount of 40 to 60 parts by weight per 100 parts by weight of total elastomers.

5. Rubber mixture in accordance with claim 1, wherein the polyisoprene has a 3,4 bond content of 60% by weight.

6. Rubber mixture in accordance with claim 1, wherein the copolymer is styrene-butadiene copolymer.

7. Rubber mixture in accordance with claim 1, wherein the silica is present in an amount of 40 to 80 parts by weight.

8. Rubber mixture in accordance with claim 1, wherein the silica has a BET surface between 150 and 250 $m^2/g$.

9. Rubber mixture in accordance with claim 1, further comprising carbon black as a further filler in an amount up to 50 parts by weight per 100 parts by weight of total elastomers with the proviso that the carbon black content is at most as large as the silica content.

10. Rubber mixture in accordance with claim 9, wherein the carbon black is present in an amount of 20 to 40 parts by weight per 100 parts by weight of total elastomers.

11. Rubber mixture in accordance with claim 1, wherein the copolymer has a glass transition temperature (Tg) of −60° C. to −10° C., the polybutadiene has a glass transition temperature (Tg) of −107° C. to −95° C. and the polyisoprene has a glass transition temperature (Tg) of −15° C. to +5° C.

12. Tire tread which contains a rubber mixture vulcanisable with sulphur in accordance with claim 1.

13. Tire having a tread vulcanised with sulphur in accordance with claim 12.

* * * * *